US010866902B2

(12) United States Patent
Bhati et al.

(10) Patent No.: US 10,866,902 B2
(45) Date of Patent: Dec. 15, 2020

(54) MEMORY AWARE REORDERED SOURCE

(71) Applicant: Intel Corporation, Santa Clara, CA (US)

(72) Inventors: Ishwar S. Bhati, Bangalore (IN); Udit Dhawan, Bangalore (IN); Jayesh Gaur, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/392,638

(22) Filed: Dec. 28, 2016

(65) Prior Publication Data

US 2018/0181329 A1 Jun. 28, 2018

(51) Int. Cl.
*B42D 25/455* (2014.01)
*G06F 12/0897* (2016.01)
*G06F 12/0811* (2016.01)
*G06F 9/38* (2018.01)

(52) U.S. Cl.
CPC ........ *G06F 12/0897* (2013.01); *G06F 9/3824* (2013.01); *G06F 12/0811* (2013.01); *G06F 2212/1041* (2013.01); *G06F 2212/1056* (2013.01); *G06F 2212/302* (2013.01)

(58) Field of Classification Search
CPC .... G06F 3/0622; G06F 3/0656; G06F 3/0685; G06F 12/0879
See application file for complete search history.

(56) References Cited

U.S. PATENT DOCUMENTS 5,960,458 A * 9/1999 Kametani ............... G06F 15/17
711/147
6,785,893 B2 * 8/2004 Morris ................ G06F 11/3409
710/260

(Continued)

OTHER PUBLICATIONS

Ausavarungnirun et al., "Staged Memory Scheduling: Achieving High Performance and Scalability in Heterogeneous Systems", IEEE, 2012, pp. 416-427.

(Continued)

*Primary Examiner* — Ryan Bertram
*Assistant Examiner* — Trang K Ta
(74) *Attorney, Agent, or Firm* — Nicholson De Vos Webster & Elliott LLP

(57) ABSTRACT

Processor, apparatus, and method for reordering a stream of memory access requests to establish locality are described herein. One embodiment of a method includes: storing in a request queue memory access requests generated by a plurality of execution units, the memory access requests comprising a first request to access a first memory page in a memory and a second request to access a second memory page in the memory; maintaining a list of unique memory pages, each unique memory page associated with one or more memory access requests stored the request queue and is to be accessed by the one or more memory access requests; selecting a current memory page from the list of unique memory pages; and dispatching from the request queue to the memory, all memory access requests associated with the current memory page before any other memory access request in the request queue is dispatched.

25 Claims, 17 Drawing Sheets

(56) References Cited

U.S. PATENT DOCUMENTS

| | | | | |
|---|---|---|---|---|
| 2008/0126641 | A1* | 5/2008 | Irish | G06F 13/1631 710/112 |
| 2010/0023664 | A1* | 1/2010 | Chang | G06F 13/36 710/112 |
| 2013/0297906 | A1* | 11/2013 | Loh | G06F 13/1642 711/167 |
| 2013/0304991 | A1* | 11/2013 | Bottcher | G06F 12/1054 711/122 |
| 2014/0379959 | A1* | 12/2014 | Canepa | G06F 12/0246 711/103 |
| 2015/0356019 | A1* | 12/2015 | Johar | G06F 12/0871 711/142 |
| 2015/0371689 | A1* | 12/2015 | Li | G11C 11/4087 711/105 |
| 2016/0359973 | A1* | 12/2016 | Loh | H04L 67/1097 |
| 2018/0121360 | A1* | 5/2018 | Chen | G06F 12/0862 |

OTHER PUBLICATIONS

C.-T. Chen et al., "Designing Coalescing Network-on-Chip for Efficient Memory Accesses of GPGPUs", IFIP International Federation for Information Processing, 2014, pp. 169-180.

D. Kanter, "Intel's Ivy Bridge Graphics Architecture", available online at <https://www.realworldtech.com/ivy-bridge-gpu/>, Apr. 22, 2012, 1 page.

Dublish et al., "Characterizing Memory Bottlenecks in GPGPU Workloads", IEEE International Symposium on Workload Characterization (IISWC), 2016, 3 pages.

Fang et al., "Thread-Fair Memory Request Reordering", 2012, 6 pages.

Gaur et al., "Efficient Management of Last-level Caches in Graphics Processors for 3D Scene Rendering Workloads", MICRO '46, Dec. 7-11, 2013, pp. 395-407.

Jacob et al., "Memory Systems Cache, DRAM, Disk", Elsevier Inc., 2008, 1017 pages.

Jia et al., "MRPB: Memory Request Prioritization for Massively Parallel Processors", IEEE 20th International Symposium on High Performance Computer Architecture (HPCA), Feb. 15-19, 2014, 12 pages.

Jog et al., "Application-aware Memory System for Fair and Efficient Execution of Concurrent GPGPU Applications", GPGPU-7, Mar. 1, 2014, 8 pages.

Jog et al., "OWL: Cooperative Thread Array Aware Scheduling Techniques for Improving GPGPU Performance", ASPLOS'13, Mar. 16-20, 2013, pp. 395-406.

Kim et al., "An Alternative Memory Access Scheduling in Manycore Accelerators", International Conference on Parallel Architectures and Compilation Techniques, IEEE, 2011, pp. 195-196.

Lakshminarayana et al., "DRAM Scheduling Policy for GPGPU Architectures Based on a Potential Function", IEEE Computer Architecutre Letters, 2011, 4 pages.

Oh et al., "APRES: Improving Cache Efficiency by Exploiting Load Characteristics on GPUs", IEEE Computer Society, 2016, pp. 191-203.

Rhu et al., "A Locality-Aware Memory Hierarchy for Energy-Efficient GPU Architectures", MICRO'46 Dec. 7-11, 2013, pp. 86-98.

Rogers et al., "Cache-Conscious Wavefront Scheduling", IEEE/ACM 45th Annual International Symposium on Microarchitecture, 2012, pp. 72-83.

Sethia et al., "Mascar: Speeding up GPU Warps by Reducing Memory Pitstops", IEEE, 2015, pp. 174-185.

Sun et al., "Moguls: A Model to Explore the Memory Hierarchy for Bandwidth Improvements", ISCA'11, Jun. 4-8, 2011, pp. 377-388.

Wang et al., "OAWS: Memory Occlusion Aware Warp Scheduling", PACT '16, Sep. 11-15, 2016, pp. 45-55.

Yuan et al., "Complexity Effective Memory Access Scheduling for Many-Core Accelerator Architectures", MICRO'09, Dec. 12-16, 2009, pp. 34-44.

* cited by examiner

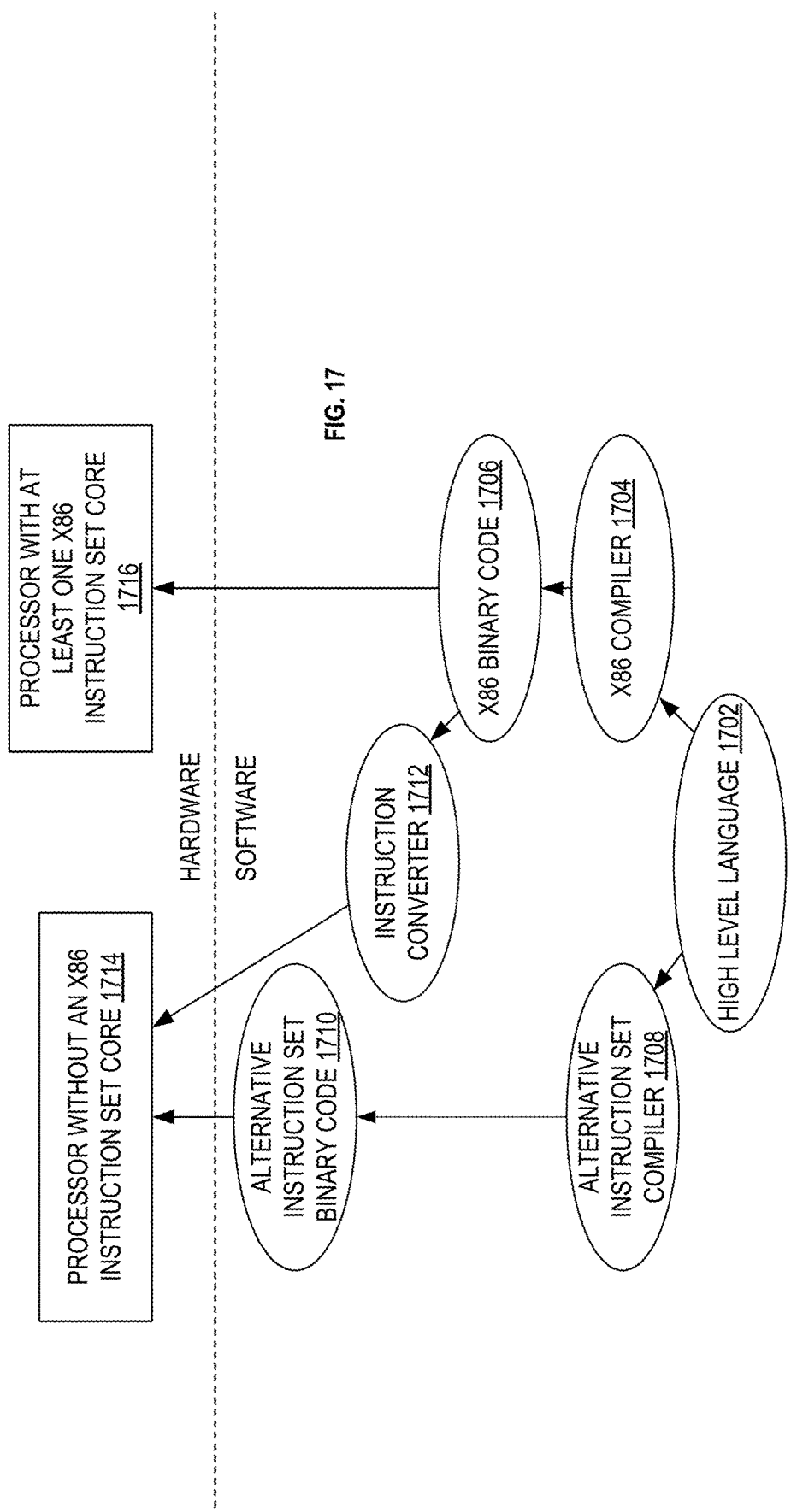

MEMORY AWARE REORDERED SOURCE

BACKGROUND INFORMATION

The demand for high memory performance continues to rise in modern computer systems. This is especially true in graphics processors (GPUs) that are used to perform data-intensive workloads such as 3D Gaming, Imaging and Perceptual Computing, and General-Purpose Computing on Graphics Processor Units (GPGPU). As a result, modern GPUs tend to be designed as massive data parallel computing engines comprising multiple processing units. As the number of threads and data streams in the GPU increases with each generation, memory efficiency is becoming even more critical in delivering high memory performance. One common issue in combining memory access requests from multiple concurrently running sources is the loss of locality between adjacent memory access requests received by the memory controller. Not having locality typically means more repeated accesses to the memory rows which in turn lead to poor memory efficiency.

Current solutions seeking to improve memory efficiency include: 1) adding more DDR channels or larger caches to provide higher bandwidth; 2) increasing memory controller pending queues; and 3) improving stream-specific or locality-aware arbitration inside the GPU. However, none of these existing solution are effective in establishing or maintaining locality in the stream of memory requests arriving at the memory controller. For instance, while adding more DDR channels and larger caches increase the available memory bandwidth at the expense of power and die space, this does not address the loss in locality as locality between memory access requests is not restored. With respect to increasing the pending queues inside the memory controller, while it allows for a larger lookahead window at the memory channel interface for recovering locality, it requires increasing the size of all buffers on the path between the source of memory access requests and the memory. As such, this solution is far from ideal because the associated increases in the power and area requirements would be prohibitive, not to mention the adverse effects it will have on the performance of other components (CPUs, FPGAs, etc.) that share the same uncore and memory controller. As for improving the stream-specific and/or locality-aware arbitrations inside the GPU, the tradeoff in performance benefits there would be questionable at best, due to the complexity involved in managing memory access requests from different streams and slices at various arbitration points within the GPU's internal interconnection network or fabric.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 17 illustrates a block diagram contrasting the use of a software instruction converter to convert binary instructions in a source instruction set to binary instructions in a target instruction set according to embodiments of the invention.

DETAILED DESCRIPTION

Figure 1:
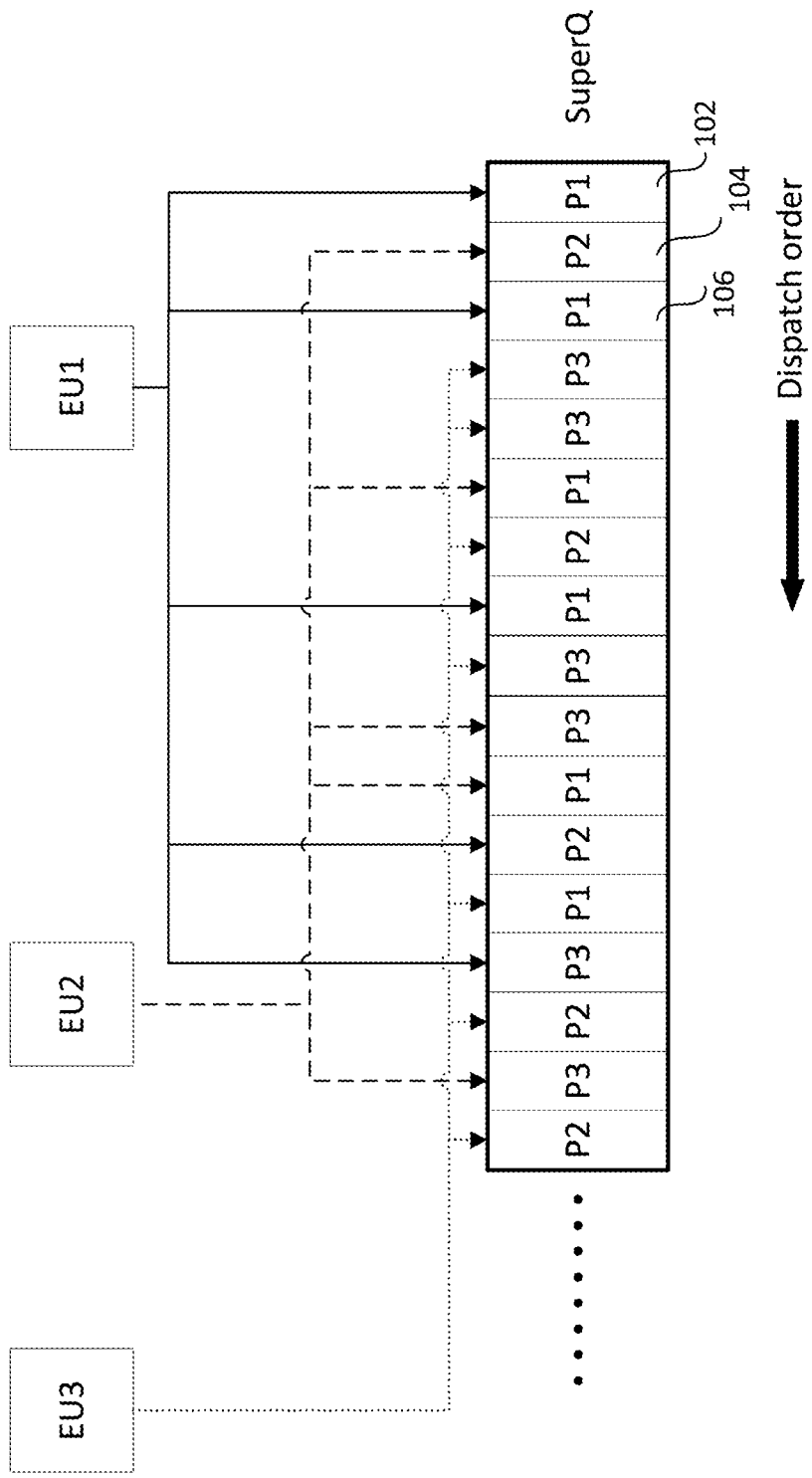
FIG. 1 illustrates how a stream of out-of-order memory access requests being stored in a queue according to prior art.

Embodiments of processor, apparatus, and method implementing a mechanism—Memory Aware Reordered Source (MARS)—for reordering memory access requests to restore memory locality is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Memory locality, or locality for short, refers to the principal that future memory accesses are near past memory accesses. Memory hierarchies, as well as memory controllers, are designed to take advantage of locality by caching recently accessed memory pages with the hope of reusing them to quickly fulfill subsequent memory access requests without having to repeat calls to the memory rows. Memory access requests that access the same or similar locations as previous requests are thus executed much faster than memory access requests that do not. As such, preserving or establishing locality by grouping memory access requests based on the memory locations (i.e., memory pages) they access can significantly increase memory efficiency and bandwidth. Multi-stream execution models utilized in modern computing systems tend to generate diverse memory access requests that access different memory pages. This is especially evident in powerful graphics processing units (GPUs) which employ highly parallel cores designed to deliver high-throughput graphics performance.

A typical GPU includes multiple processing elements or execution units (EUs) (e.g., execution hardware 1162 of FIG. 11B) with multiple levels of stream-specific caches (i.e., level 1 (L1) and level 2 (L2) caches), as well as a shared level 3 (L3) cache. Each EU is capable of running 6-7 SIMD (Single Input Multiple Data) threads that can simultaneously operate on independent graphics streams. A memory interface acts as the point of convergence for all of the memory access requests (e.g., read/write accesses) to be directed toward the memory. In operation, memory access requests originating from the EUs and caches in the GPU go through multiple levels of arbitration within the GPU before they reach the memory interface. The memory interface buffers the received requests in a first in first out (FIFO) buffer that is sometimes referred to as a super queue (SuperQ). These buffered requests are then forwarded by the memory interface to the memory controller in the uncore based on a credit-flow interface. Each arbitration along the way merges the traffic from difference sources (i.e. different EUs or threads) which results in a highly scattered stream of memory access requests arriving at the memory interface. This means the locality between adjacent memory access requests in the super queue is likely lost.

To address this issue, aspects of the present invention reestablishes locality by reordering out-of-order memory access requests based on the memory page associated with each request before they are dispatched to memory. One aspect of the invention introduces a mechanism called Memory Aware Reordered Source (MARS). There are two key operations involved in implementing MARS. The first is the buffering and organization of memory access requests generated by the various EUs or threads within in the GPU. The second is the selection of memory access requests to be dispatched from GPU to memory. The combination of these two operations enables MARS to establish a lookahead window to observe locality within a stream of out-of-order memory access requests and then reorders them by selectively dispatching these requests to the super queue before they are submitted to the memory/memory controller in the uncore. With MARS, a request queue is added between the various execution units and super queue. The key purpose of the request queue is to buffer sufficient memory access requests in order to provide a large lookahead window for capturing and establishing locality within the buffered memory access requests. According to an embodiment, a request queue may be any size because, unlike the super queue, it is not constrained by the size of the memory channel and/or the size of the buffer in the memory controller. In one embodiment, the request queue is larger in size than the super queue so that a larger lookahead window may be provided.

Figure 2:
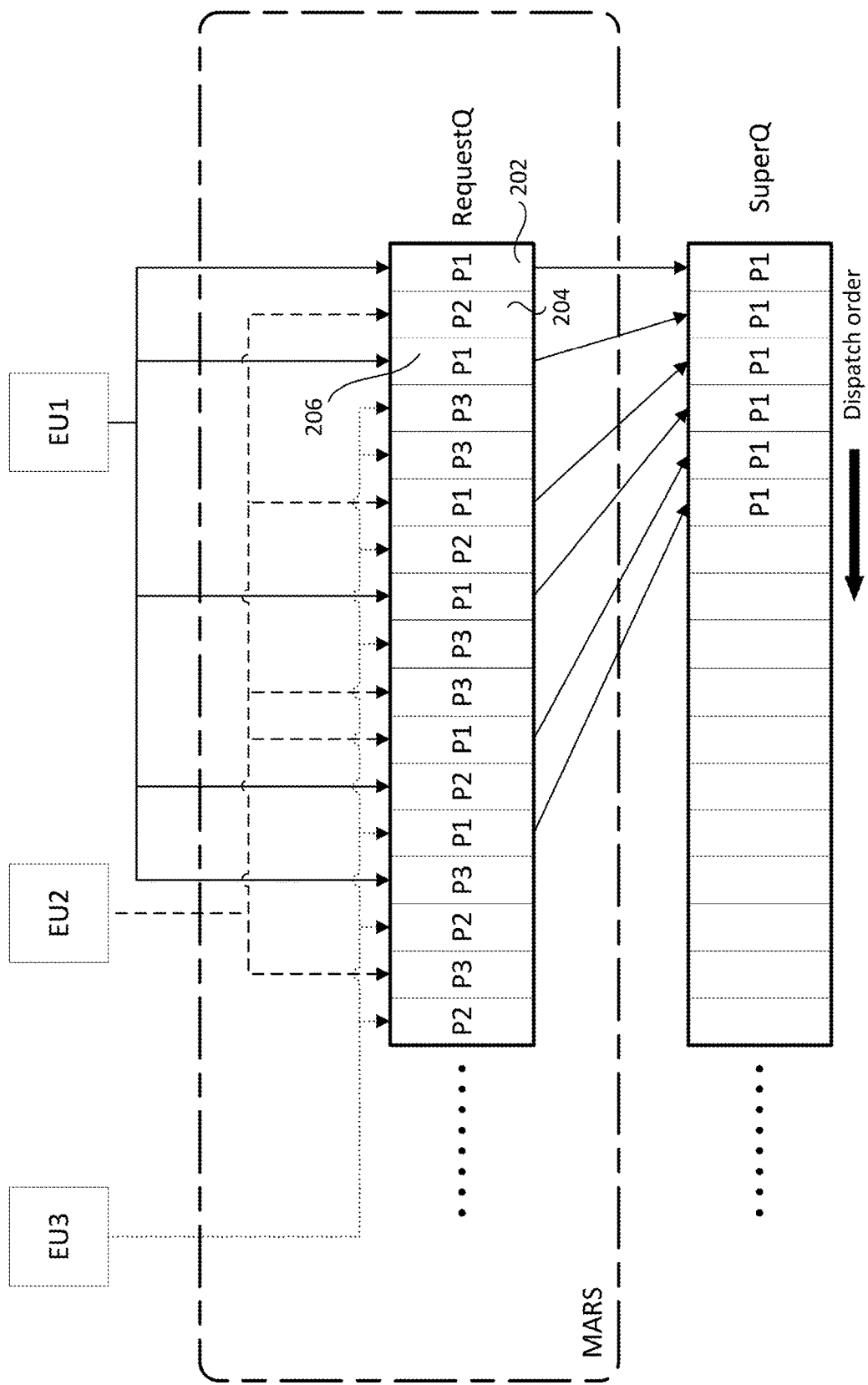
FIG. 2 illustrates the reordering of a stream of out-of-order memory access requests as performed by an embodiment of the present invention.

FIGS. 1 and 2 provide simplified illustration contrasting the prior art and MARS. In FIG. 1, which illustrates a request stream in a typical GPU, execution units 1-3 (EU1-EU3) each generate multiple memory access requests that are buffered in the super queue. These memory access requests may be generated through the execution of different threads by different execution unit at different times. This typically results in a stream of requests arriving at the super queue where one request accesses a memory page that is different than the memory page to be accessed by next request. For example, the first buffered memory access request 102 in the super queue 102 is generated by EU1 to access memory page P1. The second buffered memory access request 104 is generated by EU2 to access a different memory page, P2. The third buffered memory access request 106 is again generated by EU1 to accesses memory page P1. Because each request seeks to access a different memory page then the request before it, there is a loss of locality between consecutive memory access requests arriving at the super queue. In contrast, FIG. 2 illustrates the same stream of memory access requests being processed by MARS before the requests are buffered into the super queue (SuperQ). A buffering logic (not shown) within MARS first buffers the memory access requests in a request queue (RequestQ). Then a selection logic (not shown) selectively dispatches the requests from the request queue based on the memory page each request seeks to access. For example, requests 202 and 206 are dispatched from the request queue into the super queue because they both seek to access, or are mapped to, memory page P1. In contrast, request 204 is not dispatched because it seeks to access memory page P2. The selection which memory page to use in determining whether or not to dispatch a request from the request queue will be further detailed below. From the request queue, the dispatched requests are stored into the super queue in the order they are dispatched. The end result is a reordered stream of memory access requests in the super queue in which requests that seek to access the same memory page are grouped together. Locality between consecutive memory access requests is thus re-established. From there, the reordered requests in the super queue are dispatched to the memory in the same order that they are stored.

According to an embodiment, to organize the buffered memory access requests in the request queue, a physical page list (PhyPageList) is implemented as part of MARS to track unique physical memory pages that are to be accessed, or are mapped to, by the memory access requests in the request queue. In one embodiment, the physical page list is a set-associative structure and each entry in the list is indexed by their respective page's physical page number. Also stored in the entries is their respective a list of memory access requests from the request queue that map to them. According to an embodiment, a linked list is used to efficiently store or track the list of memory access requests for each physical page. Specifically, each entry in the physical page list includes a head pointer that references an entry in the request queue which contains the first memory access request on its list. This head entry in the request queue in turn includes a pointer referencing another entry in request queue entry which contains the next memory access request on its list. According to the embodiment, the memory access requests in each physical page respective list are ordered or arranged chronologically based on the order by which they are added to the list. Organized this way, every physical page entry in the physical page list needs to track or reference only the head and tail entries of their respective list of memory access requests in the request queue. According to an embodiment, the memory access request referenced by the head pointer is oldest request in the list and the one referenced by the tail pointer is the newest. In another embodiment, the reverse is true. All memory access requests that map to a particular physical page can be referenced accessed through the physical page list without needing a cache access memory (CAM) lookup.

In one embodiment, the request queue is implemented as an out-of-order buffer where memory access requests can be inserted into and extracted from any slot in the request queue. To more efficiently find an empty slot in the request queue for inserting new memory access requests, a request queue occupancy map may be implemented. According to an embodiment, the request queue occupancy map is a bit vector where each bit corresponds to a specific slot in the request queue. A bit value of 1 would indicate that the corresponding slot in the request queue is occupied while a bit value of 0 would indicate that the corresponding slot is available.

To send memory access requests that all access the same physical memory page together (i.e., back-to-back) from the request queue to the memory, a physical memory page is first be selected. In one embodiment, a physical page is selected if it has the oldest memory access request in the request queue mapping to it. According to the embodiment, the oldest memory access request in the request queue is the memory access request that has been inserted into the request queue the earliest. To track chronically which physical page contains the oldest memory access request, a first-in-first-out (FIFO) physical page order queue (PhyPageOrderQ) is utilized. Whenever a new entry in the physical page list is created, a corresponding entry containing the physical page number of the new physical page list entry is inserted into the physical page order queue. As such, the first entry in the physical page order queue will always be the physical page list with the oldest memory access request. This avoids wasting time on searching for a new physical page when the memory access requests associated with the current physical page list have been exhausted.

Figure 3:
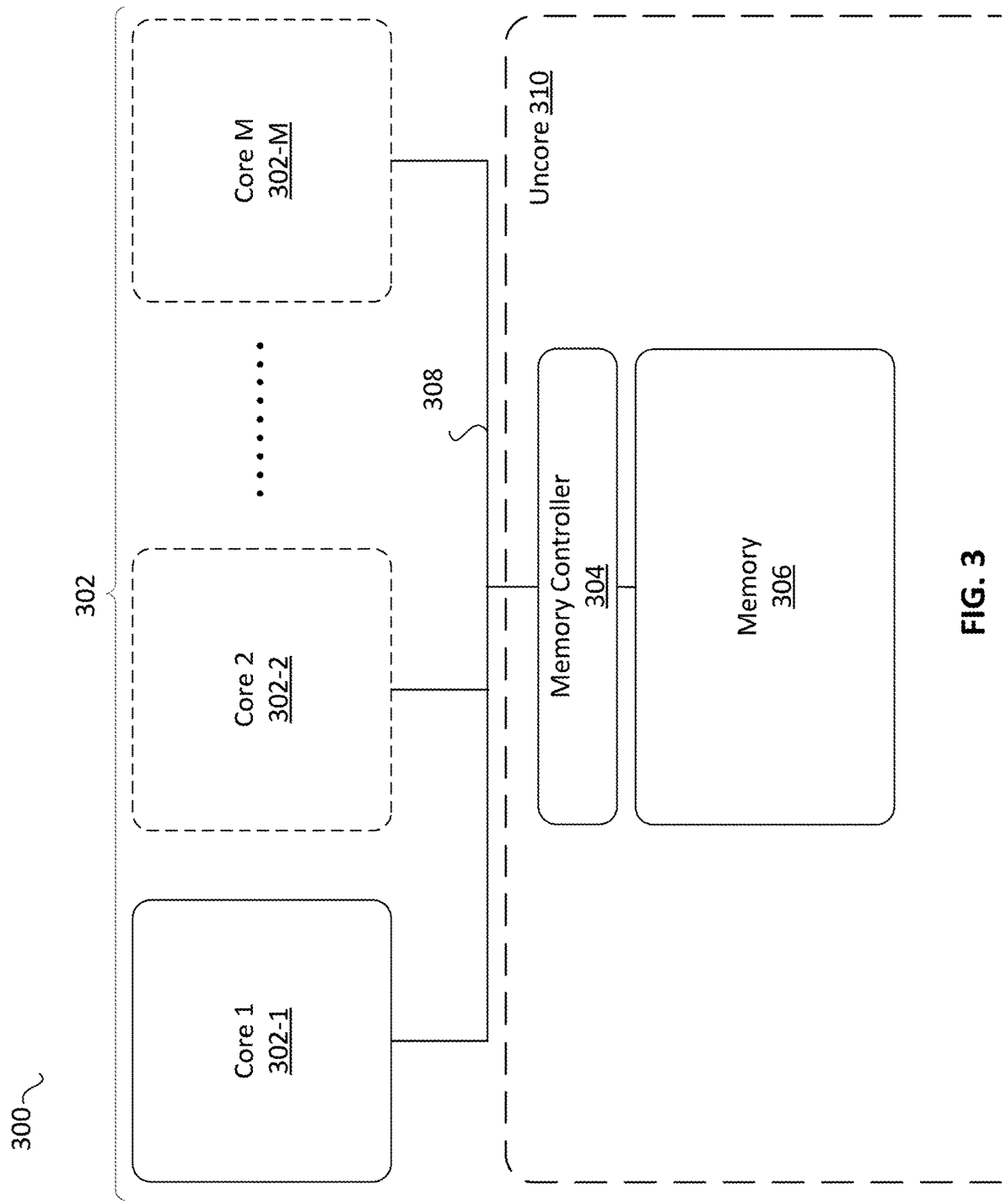
FIG. 3 is a block diagram illustrating a high-level view of an exemplary hardware system in which embodiments of the present invention may be implemented.

FIG. 3 is a block diagram illustrating a high-level view of an exemplary hardware system in which embodiments of the present invention may be implemented. Hardware system 300 includes one or more cores 302, a memory controller 304, and a memory 306. A high-speed interconnect 308 connects the one or more cores 302 and the memory controller 304. The memory controller controls access to the memory 306 by processing and responding to memory access requests from the cores 302. The memory 306 is typically referred to as the system's main memory or random access memory (RAM). Dynamic random access memory (DRAM) and static random access memory (SRAM) are examples of such memory. In one embodiment, the memory controller 304 and the memory 306 are located in, or are a part of, the uncore. According to embodiments of the present invention, the cores 302 may be any intellectual property (IP) that operates on multiple processing streams and suffers from memory inefficiency due to the IP's inability to control or maintain locality in the stream of memory access requests exiting the IP. One embodiment of a core includes a system on chip (SoC) such as a central processing unit (CPU), graphics processing unit (GPU), field programmable gateway array (FPGA), etc. The hardware system 300 may include other components that are not shown to avoid obscuring and/or complicating aspects of the present invention.

Figure 4:
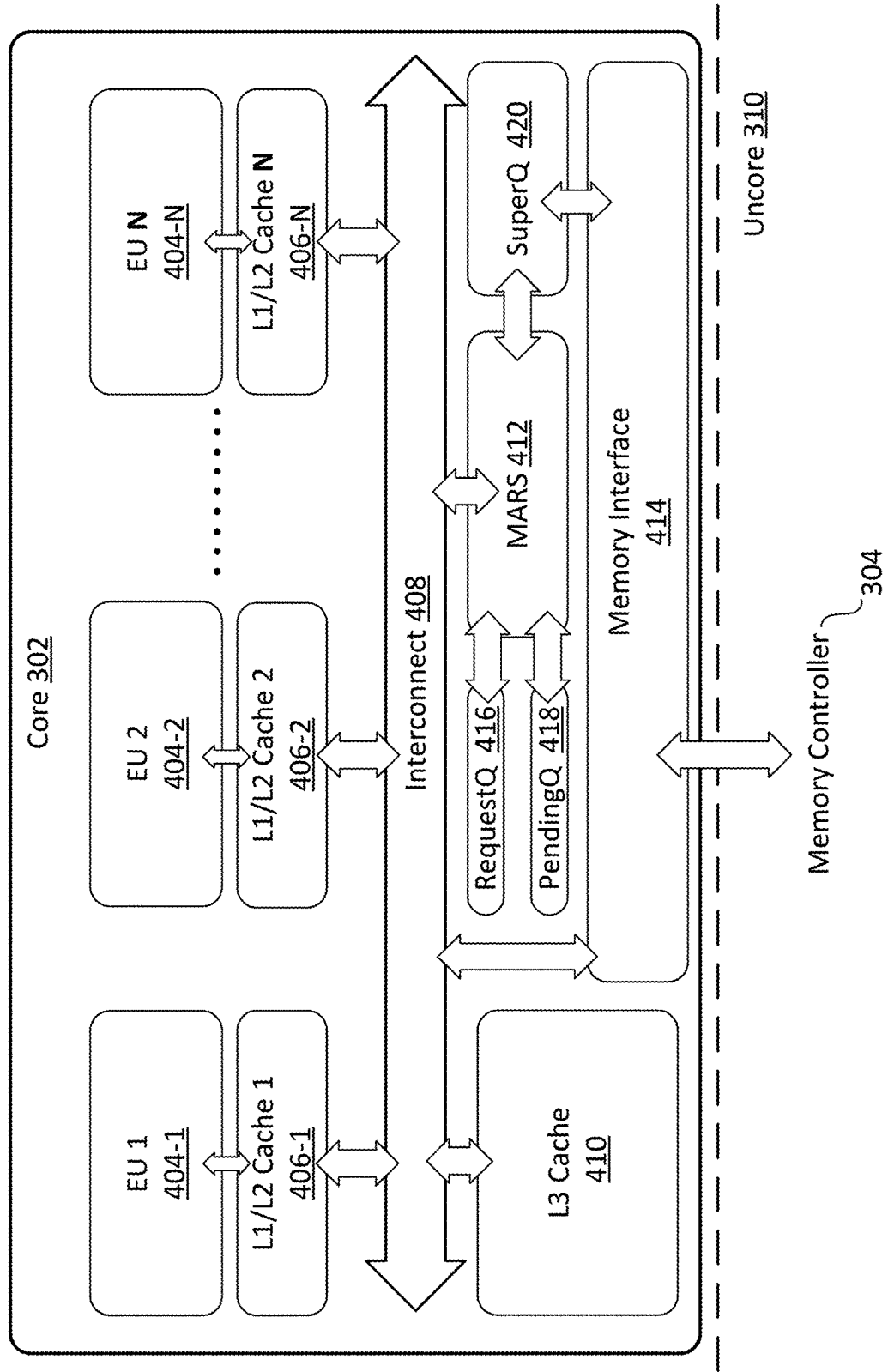
FIG. 4 is a block diagram illustrating an exemplary embodiment of a core implementing a memory aware reorder source (MARS) logic component.

FIG. 4 is a block diagram illustrating an exemplary embodiment of a core. According to the embodiment, core 302 is a high-power GPU that includes multiple execution units (EUs) such as EUs 1 through N 404-1-404-N. Moreover, each EUs 404-1-404-N is associated with its respective cache. This cache may be a single-level L1 cache or a multi-level L1/L2 cache (e.g., L1/L2 Caches 406-1-406-N). In some embodiments, additional levels of cache may also be implemented. In FIG. 4, the core 302 further includes a shared cache (i.e., L3 cache 420), a MARS logic component 412, and a memory interface component 414. The memory interface component 414 serves as the gateway between the core and the uncore. In some embodiments, the MARS logic component 412 and the memory interface component 414 may be implemented together as a single unit. A high-speed interconnect 408 provides connection between the various components within the core. The interconnect 408 may be a single connection (e.g., a ring) or may comprise several separate (i.e., point to point) connections.

As will be further detailed below, the MARS logic component 412 includes, or is communicatively coupled to, a request queue (RequestQ) 416 and a pending queue (PendingQ) 418. In some embodiments, there may be multiple request queues and/or pending queues. The request queue 416 is an out-of-order buffer used to store memory access requests generated by the EUs that are bound for the memory. The pending queue 418, on the other hand, is an in-order buffer used to store overflow memory access requests when either the physical page list or the request queue is full. The memory interface 414 includes, or is coupled to, a super queue (SuperQ) 420. The super queue 420 is an in-order buffer for storing memory access requests dispatched from the request queue 416 by the MARS logic component 412. Memory access requests in the super queue 420 are to be sent out, according to the order they are received, from the core 302 to the memory controller 306 through the memory interface 414. While as shown in FIG. 4, the request queue 416 and the pending queue 418 are separate from the MARS logic component 412, in some embodiments, one or both of the queues may be implemented as part of the MARS logic component 412. The same applies to the super queue 420, which instead of being separate from the memory interface 414, it may be implemented as part of the memory interface component 414. All memory access requests sent from the core 302 to the memory 306 must first be sent to the MARS logic component 412 to be buffered in either the request queue 416 or the pending queue 418. The MARS logic component then selectively sends the buffered memory access requests from the request queue 416 to the super queue 420. The memory interface 414 then sends the requests from the super queue 420 to the memory controller 304 to be processed.

Figure 5:
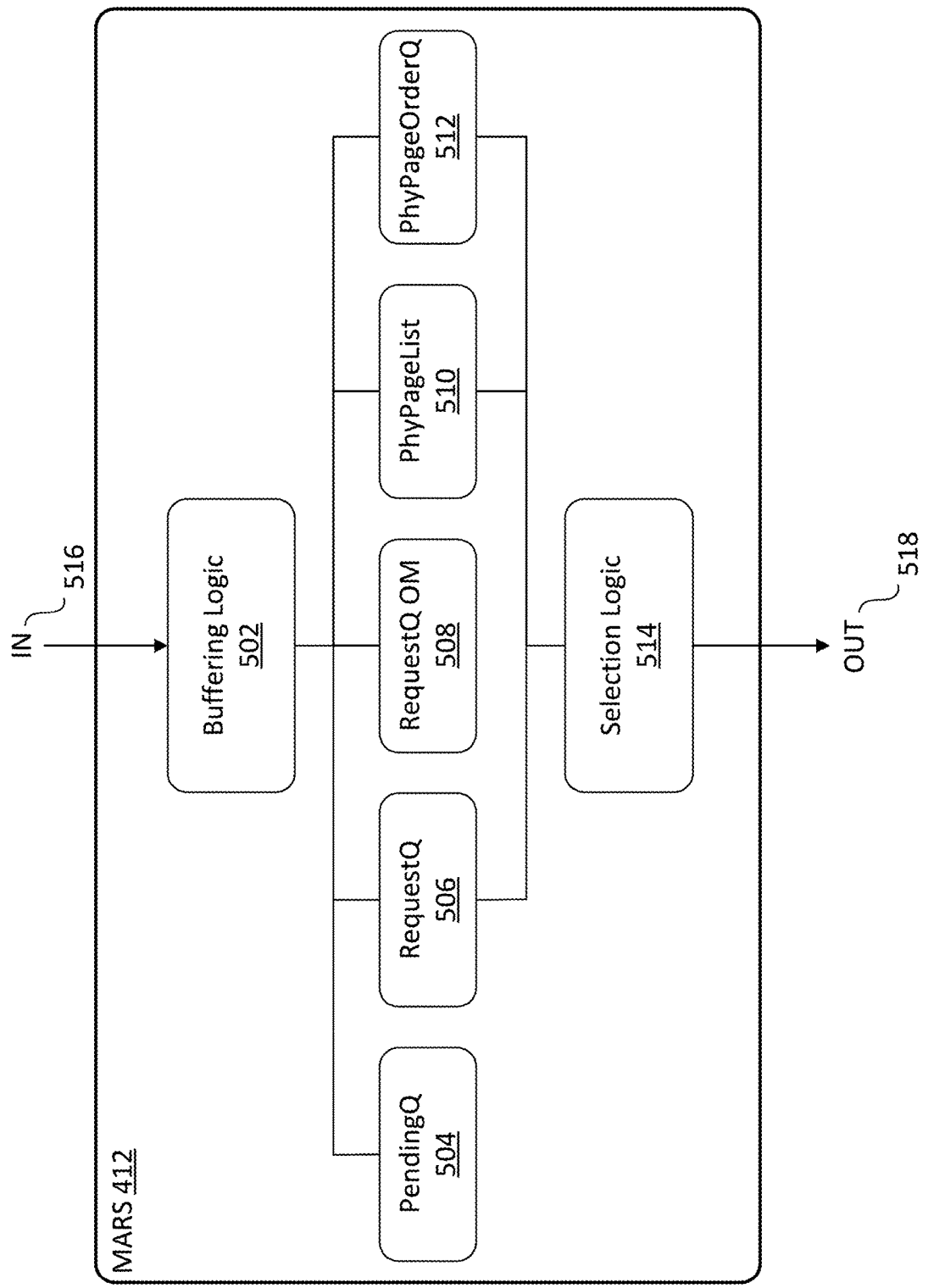
FIG. 5 is a block diagram illustrating an exemplary embodiment of the MARS logic component.

FIG. 5 is a block diagram illustrating an exemplary embodiment of the MARS logic component 412. According to an embodiment, the MARS logic component 412 is a circuit within a memory access hardware (e.g., memory access hardware 1164 of FIG. 11B). The MARS logic component 412 includes buffering logic 502, pending queue (pendingQ) 504, request queue (RequestQ) 506, request queue occupancy map (RequestQ OM) 508, physical page list (PhyPageList) 510, physical page order queue (PhyPageOrderQ) 512, and selection logic 514. The buffering logic 502 is communicatively coupled to the pending queue 504, request queue 506, request queue occupancy map 508, physical page list 510, and physical page order queue 512. The selection logic is communicatively coupled to the request queue 506, physical page list 510, and physical page order queue 512.

Figure 6:
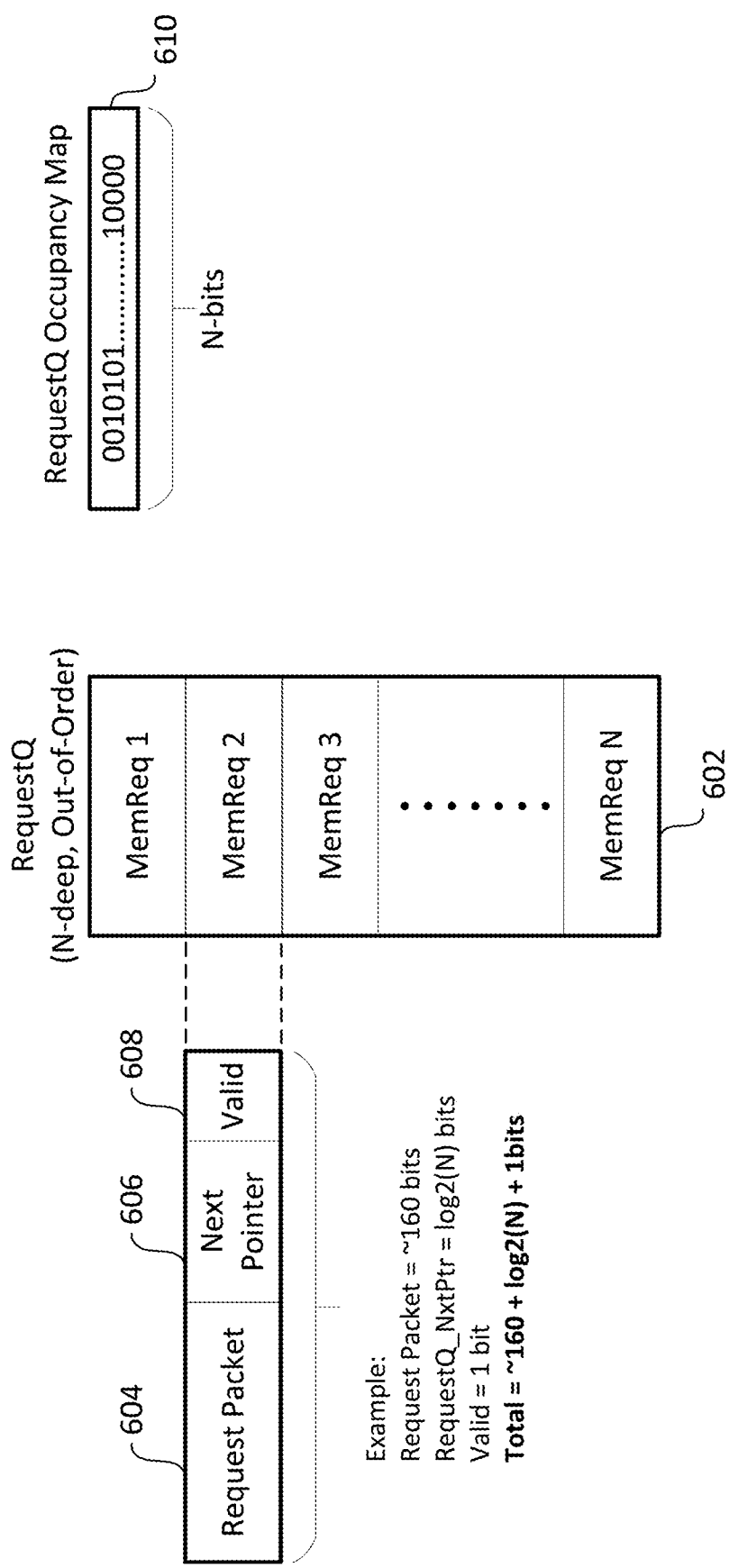
FIG. 6 is a logical representation of a request queue and the corresponding request queue occupancy map according to embodiments of the present invention.

FIG. 6 is a logical representation of a request queue and the corresponding request queue occupancy map according to an embodiment of the present invention. Request queue (RequestQ) 602 is an out-of-order buffer managed by the MARS logic component (e.g., 412 of FIG. 4) for storing the memory access requests (MemReqs) generated by the various EUs (e.g., 404 of FIG. 4) of a core (e.g., 302 of FIG. 4). In FIG. 6, request queue 602 is of size N, or N-deep, which means it is capable of storing or buffering N memory access requests (i.e., MemReq 1 to MemReq N). The size of the request queue determines the size of the lookahead window for capturing and establishing locality in the received memory access requests. In one embodiment, the request queue is capable of storing 512 memory access requests (i.e., N=512). Being an out-of-order buffer, entries in request queue (i.e., MemReq 1 to MemReq N) may be inserted and extracted in any order and from any slot. The request queue may be implemented as a linked list, array, or any other suitable data structure. According to an embodiment, each request queue entry includes a memory access request packet 604, a next pointer (RequestQ NxtPtr) 606, and a valid bit 608. The memory access request packet 604 is the actual memory access request received from the EU. The next pointer 606 points to another request queue entry that stores a subsequently received memory access request which maps to the same memory page as the one mapped to by the current entry. The valid bit 608 indicates whether an entry is currently occupied or is available for storing a new memory access request. In an exemplary embodiment, the request packet 604 comprises P bits, the next pointer 606 is of log 2(N) bits, and the valid bit occupies 1 bit. The size of each request queue entry in this embodiment is thus P+log 2(N)+1 bits.

In at least some embodiments, a request queue occupancy map 610 is implemented to provide a quick reference of each request queue entry's availability to store a new memory access request. The size of the request queue occupancy map 610 corresponds to the size of the request queue. Each entry in the request queue is represented by a corresponding bit in the request queue occupancy map 610. In one embodiment, the request queue occupancy map for a request queue comprising N entries is N-bits. According to an embodiment, a bit in the request queue occupancy map 610 is set to 1 if the corresponding slot in the request queue is occupied. The same bit is set to 0 if the corresponding slot is available to store a new memory access request. In some embodiments, the reverse is true.

Figure 7:
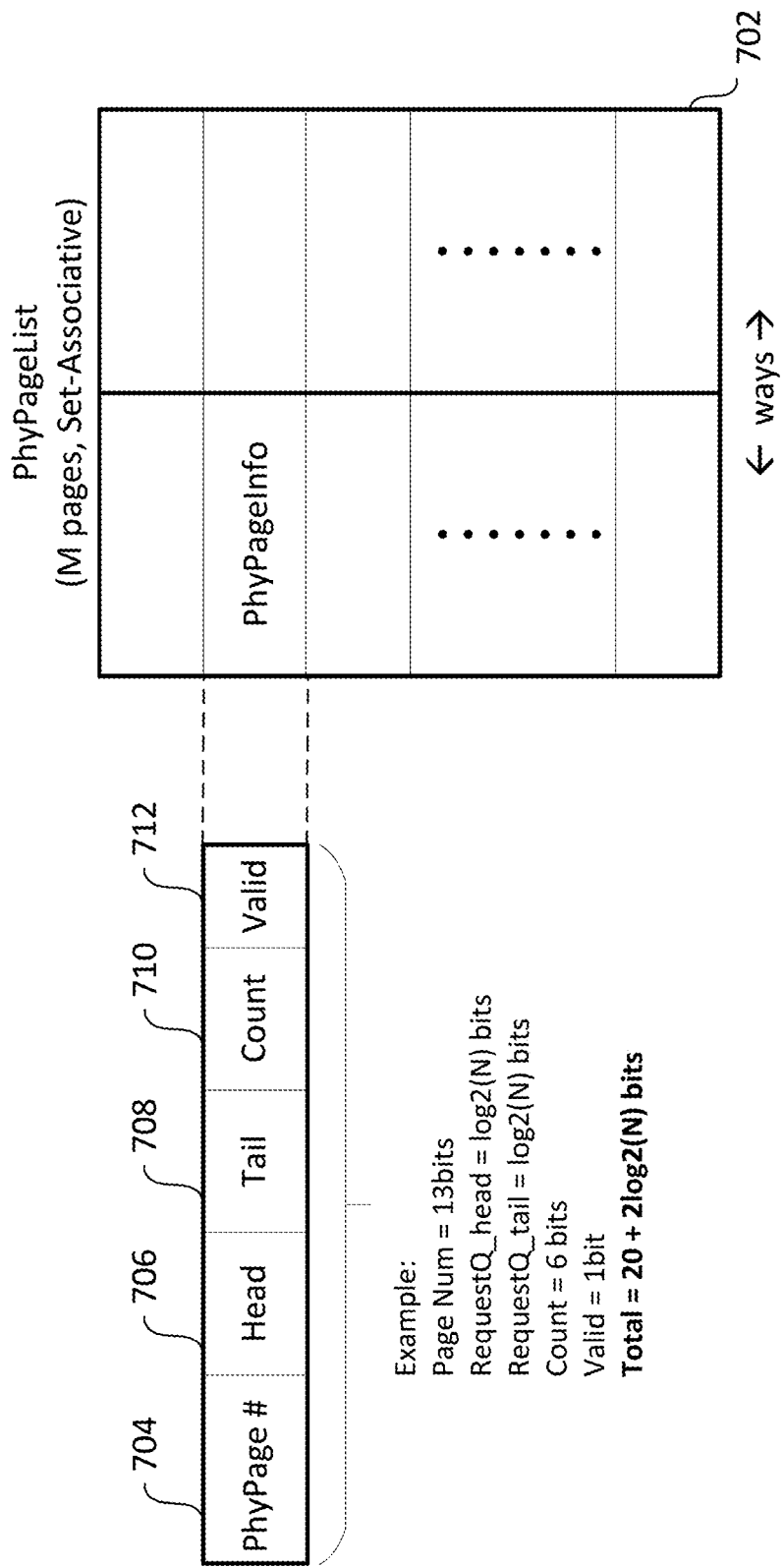
FIG. 7 illustrates a logical representation of a physical page list (PhyPageList) according to an embodiment.

FIG. 7 illustrates a logical representation of a physical page list (PhyPageList) according to an embodiment. Each entry in the physical page list corresponds to a unique physical page in memory and is used to store information relating to the memory access requests currently stored in the request queue that map to the unique physical page. In one embodiment, the physical page list 702 is implemented as a set associative data structure that includes M entries for tracking M unique pages. According to an embodiment, each physical page list entry includes a physical page number field (PhyPage #) 704, a head request field (Head) 706, a tail request field (Tail) 708, a count field 710 and a valid bit 712. The physical page number field 704 stores the page number of the physical page corresponding to the physical page list entry. The head 706 and tail 708 request fields each stores the index to an entry in the request queue. The entry in the request queue referenced by the head request field 706 contains the first request in the list of memory access requests that are mapped to the physical page. The entry referenced by the tail request field 708 contains the last request in the list of memory access request that are mapped to the physical page. The count field 710 tracks the number of requests in that list. The valid bit 712 indicates whether the entry is currently occupied or available for storing a new physical page. In an exemplary embodiment, the physical page number field 704 is approximately 13 bits, the head and tail request fields are each log 2(N) bits, the count field 710 contains 6 bits, and the valid bit takes one bit. The total size of each physical page list entry, according to the exemplary embodiment, is 20+2 log 2(N) bits.

Figure 8:
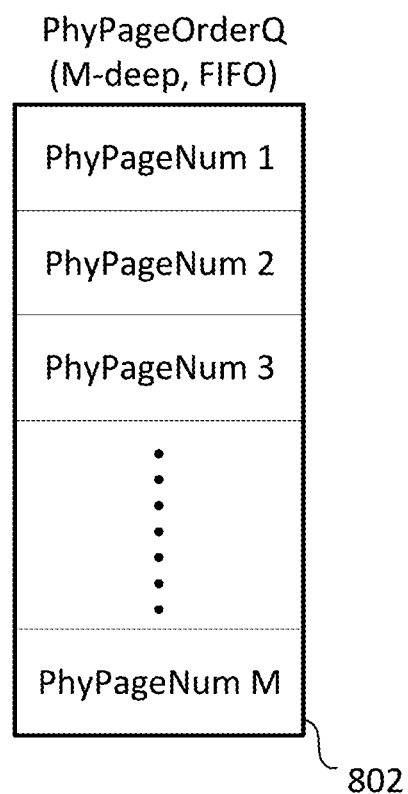
FIG. 8 is an exemplary embodiment of a physical page order queue (PhyPageOrderQ)

FIG. 8 is an exemplary embodiment of a physical page order queue (PhyPageOrderQ). The physical page order queue 802 is simply a first-in-first-out (FIFO) buffer comprising M entries. According to an embodiment, each entry in the physical page order queue 802 contains the physical page number or the index used to identify an entry in the physical page list (e.g., 702 of FIG. 7). Every time an entry in the physical page list is created, a corresponding entry is inserted into the physical page order queue 802. Since the physical page order queue 802 is FIFO, the entries in it are arranged chronological based the order their creation or insertion into the physical page order queue 802. As such, the first entry in the physical page order queue 802 will always the earliest created entry relative to the others. The first entry thus identifies the oldest physical page. According to an embodiment, the memory access requests in the request queue that map to the oldest physical page will be the first ones to be selected and dispatched by the MARS logic component 412. When all the memory access requests associated with the oldest physical page have been dispatched to the memory interface 414 by the MARS logic component 412, the oldest physical page's corresponding entry in the physical page list 702 will also be invalidated or deleted. In similar fashion, the first entry in the physical page order queue 802 will also be invalidated or deleted and the next entry in the physical page order queue 802 will be used to identify the oldest physical page out of all of the remaining physical pages.

Figure 9:
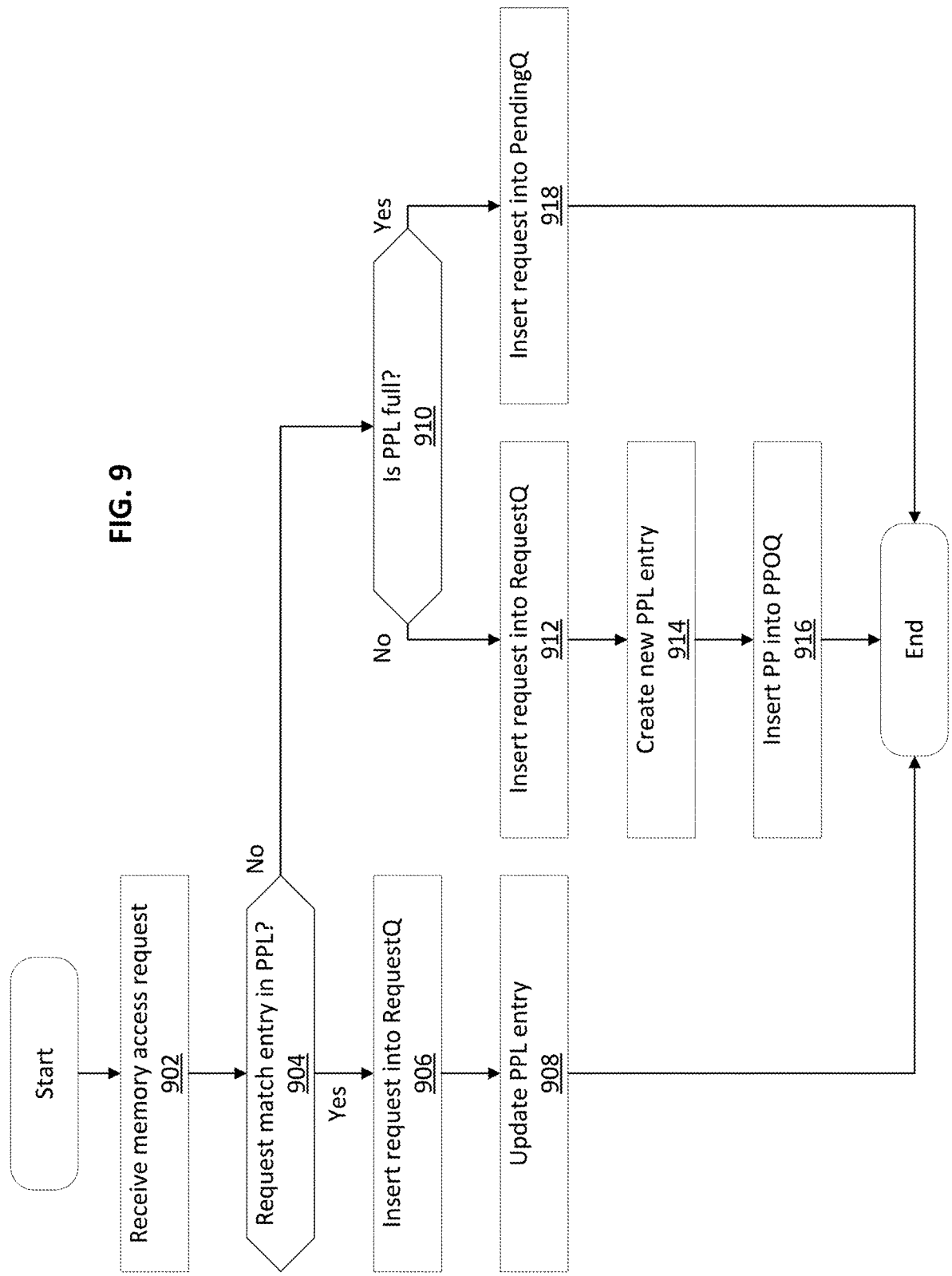
FIG. 9 is a flow chart illustrating the operations and logic for implementing the buffering logic of the MARS logic component according to an embodiment.

FIG. 9 is a flow chart illustrating the operations and logic for implementing the buffering logic of the MARS logic component 412 according to an embodiment. The discussion of FIG. 9 will reference various elements of FIG. 5. At 902, the buffering logic 502 of the MARS logic component 412 receives a memory access request through input 516. In one embodiment the memory access request is sent by an execution unit or a thread in the GPU. At 904, a search is conducted in the physical page list (PPL) to determine if there is an entry matching the physical page mapped to by the memory access request. An example of the pseudocode is as follows:

m=Search PhysicalPage(R) in PhyPageList, where R=the newly received memory access request.

If an entry containing a matching physical page is found in the physical page list, the received memory access request is inserted into the request queue at 906. The following is an example of the pseudocode for creating a new entry in the request queue:

```
n = <empty RequestQ slot>
RequestQ[n].pkt = R
RequestQ[n].NxtPtr = NULL
```

At 908, the entry containing the matching physical page in the physical page list is updated to account for the newly inserted memory access request entry in the request queue. The following is an example of the pseudocode for updating the physical page list entry:

```
PhyPageList[m].count++
t = PhyPageList[m].tail
RequestQ[t].NxtPtr = n
PhyPageList[m].tail = n
```

After updating the physical page list, the insertion of the memory access request into the request queue is complete.

Returning to 904, if no entry containing a matching physical page was found in the physical page list, a check is made at 910 to see if physical page list is full. If the physical page list is not full, the memory access request is inserted into the request queue at 912. An example of the pseudocode for creating a new entry in the request queue is as follows:

```
n = <empty RequestQ slot>
RequestQ[n].pkt = R
RequestQ[n].NxtPtr = NULL
```

Then at 914, a new entry is added to the physical page list. The new physical page list entry contains information pertaining to the physical page mapped to by the memory access request. The following is an example of the pseudocode for creating a new physical page list entry:

```
PhyPageList[m].PageNum = R.PageNum
PhyPageList[m].count = 1
PhyPageList[m].head = n
PhyPageList[m].tail = n
```

After the newly created physical page is added to the physical page list, the physical page order queue (PPOQ) is updated to account for the new physical page. In one embodiment, the new physical page is added to the end of the physical page order queue which is FIFO. After updating the physical page order queue, the insertion of the memory access request into the request queue is complete.

Returning to 910, if the physical page list was full, then no new physical page list entry may be created to add the physical page mapped to by the memory access request. As such, the memory access request is stored into a pending queue to be processed at a later time when a slot in the physical page list frees up.

Figure 10:
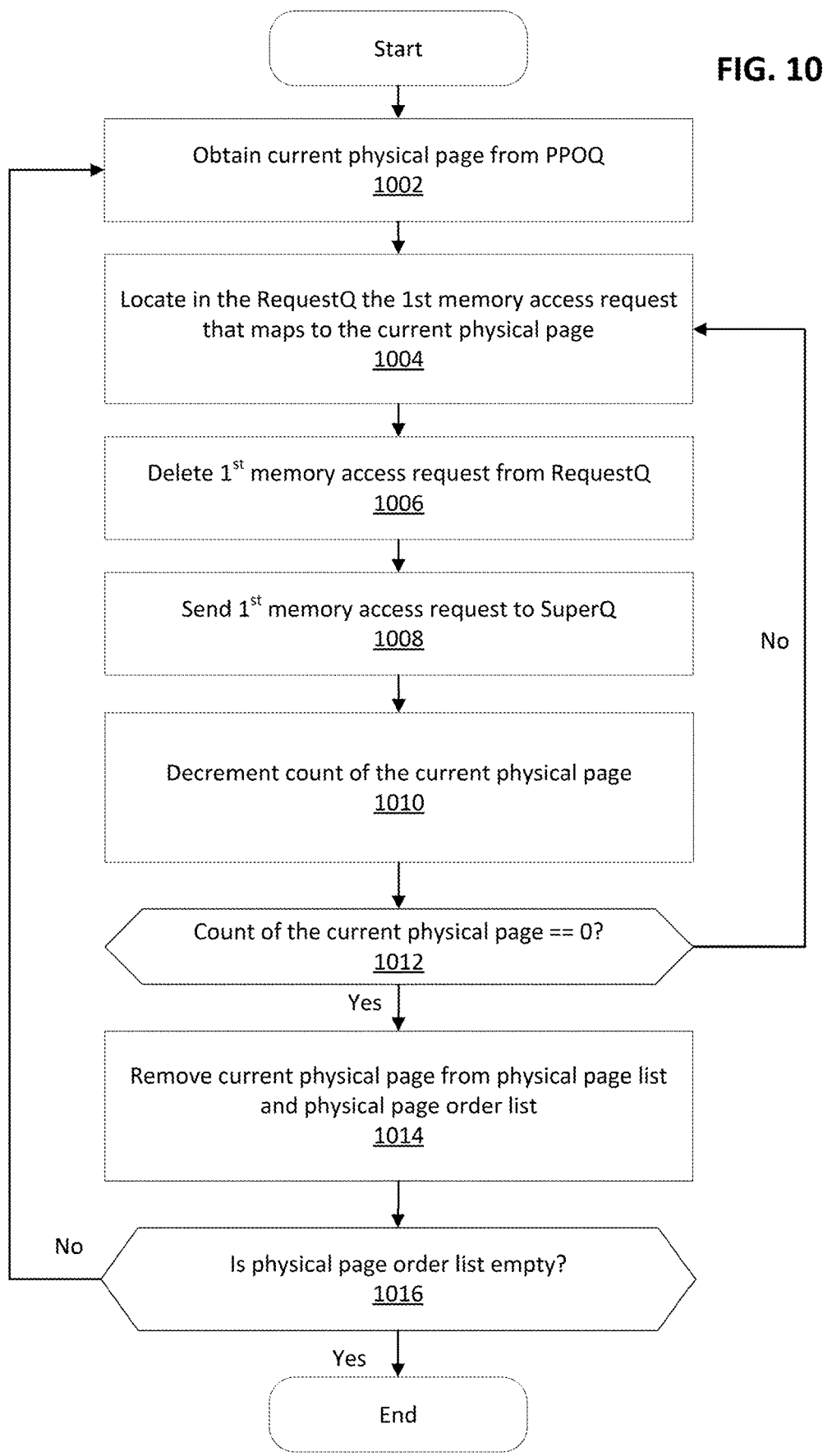
FIG. 10 is a flow chart illustrating the operations and logic for implementing the selection logic of the MARS logic component according to an embodiment.

FIG. 10 is a flow chart illustrating the operations and logic for implementing the selection logic of the MARS logic component 412 according to an embodiment. The discussion of FIG. 10 will reference various elements from FIGS. 4 and 5. At 1002, the selection logic 514 obtains a current physical page from the physical page order queue (PPOQ) 512. In one embodiment, the physical page order queue 512 is a FIFO buffer and the physical page referenced to by the first entry in the physical page order queue 512 is selected as the current physical page. This physical page will have the oldest memory access request mapped to it. At 1004, the first memory access request in a list of memory access requests that map to the current physical page is located. This memory access request is also the oldest request out of all the memory access requests stored in the request queue. According to an embodiment, the first memory access request is referenced by the head attribute of the current physical page. An example of the pseudocode for obtaining the first memory access request from the list of memory access requests that map to the current physical page is as follows:

```
CurentPhyPage = PhyPageOrder.pop_front
N = CurrPhyPage.head
```

At 1006, the first memory access request is deleted from the request queue. According to an embodiment, deleting the first memory access request from the request queue means invalidating the request queue entry containing the first memory access request. An example of the pseudocode for deleting the first memory access request from the request queue is as follows:

```
R = RequestQ[N]
CurrPhyPage.head = RequestQ[N].NextPtr
RequestQ[N].valid = False
```

At 1008, the first memory access request is send to the super queue 420 to be dispatched by memory interface 414 to the memory controller 304 in the uncore 310. At 1010, the count of the current physical page is decremented by 1 as the first memory access request has been dispatched to the super queue 420. This may simply be accomplished by the pseudocode:

CurrPhyPage.count--

At 1012, the count of the current physical page is checked. If the count is not zero, indicating that there are more memory access requests in the list of memory access requests that map to the current physical page, then selection logic 514 returns to 1004 to locate the next memory access request to be dispatched to the super queue 420. If, however, the count of the current physical page does equal to zero, indicating that there are no more memory access requests left that are still mapped to the current physical page, then at 1014, the entries corresponding to the current physical page is removed from both the physical page list 510 as well as the physical page order queue 512. Next, at 1016, a check is made to see if the physical page order queue 512 is empty. If so, meaning that there are no more physical pages and hence no more memory access requests left in the request queue to dispatch, the dispatching process is complete. However, if the physical page order queue 512 is not empty, the selection logic 514 returns to 1002 to obtain a new physical page from the physical page order queue 512 and begins dispatching the memory access requests that are mapped to the new physical page.

One embodiment of the present invention is a system that includes a memory and a processor core. The memory and the processor being communicatively coupled to each other. The processor core further includes multiple of execution units and a memory aware reordered source (MARS) circuitry. Each of the execution units is communicatively coupled to the MARS circuitry so that the MARS circuitry receives all of the memory access requests generated by the execution units. At least some of the received memory access requests are to access different memory pages, such that a first request is to access a first memory page in the memory and a second request is access a second memory page in the memory that is different from the first. The MARS circuitry also maintains a list of unique memory pages. Each of the unique memory page in the list is associated with, and is to be accessed by, one or more memory access requests stored the request queue. The MARS circuitry is to select a current memory page from the list of unique memory pages and to dispatch all the memory access requests that associated with the current memory page from the request queue to the memory, before any other memory access request in the request queue are dispatched. The memory pages referred to here may be physical memory page in the memory. The request queue may be an out-of-order queue such that the memory access requests generated by the plurality of execution units may be inserted into and extracted from any slot in the request queue. The MARS circuitry may buffer memory access requests generated by the plurality of execution units in a pending queue if the list of unique memory pages is full. The MARS circuitry may track chronologically when each unique memory pages is inserted into the list of unique memory pages, such that if a first unique memory page is inserted into the list of unique memory pages before a second unique memory page is inserted, the first unique memory page is considered older than the second unique memory page. The MARS circuitry may select the oldest unique memory page from the list of unique memory pages as the current memory page. When dispatching memory access requests that are associated with the current memory page to memory, the MARS circuitry may first send the requests to a super queue. In some cases, the size of the request queue is larger than the super queue. The super queue may be part of the MARS circuitry or it may be part of a memory interface that is communicatively coupled to the MARS circuitry and the uncore.

Another embodiment of the present invention is a processor that includes multiple execution units, a request queue, and a memory aware reordered source (MARS) circuitry. Each of the execution units is communicatively coupled to the MARS circuitry so that the MARS circuitry receives all of the memory access requests generated by the execution units. At least some of the received memory access requests are to access different memory pages, such that a first request is to access a first memory page in a memory and a second request is access a second memory page in the memory that is different from the first. The MARS circuitry also maintains a list of unique memory pages. Each of the unique memory page in the list is associated with, and is to be accessed by, one or more memory access requests stored the request queue. The MARS circuitry is to select a current memory page from the list of unique memory pages and to dispatch all the memory access requests that associated with the current memory page from the request queue to the memory, before any other memory access request in the request queue are dispatched. The memory pages referred to here may be physical memory page in the memory. The request queue may be an out-of-order queue such that the memory access requests generated by the plurality of execution units may be inserted into and extracted from any slot in the request queue. The MARS circuitry may buffer memory access requests generated by the plurality of execution units in a pending queue if the list of unique memory pages is full. The MARS circuitry may track chronologically when each unique memory pages is inserted into the list of unique memory pages, such that if a first unique memory page is inserted into the list of unique memory pages before a second unique memory page is inserted, the first unique memory page is considered older than the second unique memory page. The MARS circuitry may select the oldest unique memory page from the list of unique memory pages as the current memory page. When dispatching memory access requests that are associated with the current memory page to memory, the MARS circuitry may first send the requests to a super queue. In some cases, the size of the request queue is larger than the super queue. The super queue may be part of the MARS circuitry or it may be part of a memory interface that is communicatively coupled to the MARS circuitry and the uncore.

Another embodiment of the present invention includes an apparatus that is communicatively coupled to a plurality of execution units of a processor core and comprises a buffering logic circuitry and a selection logic circuitry. The buffering logic circuitry is to store memory access requests generated by the plurality of execution units, in a request queue. The memory access requests include a first request to access a first memory page in a memory and a second request to access a second memory page in the memory. The buffering logic circuitry is also to maintain a list of unique memory pages, where each unique memory page is associated with one or more memory access requests that are stored the request queue. Each unique memory page is also to be accessed by these one or more memory access requests. The selection logic circuitry, on the other hand, is to select a current memory page from the list of unique memory pages and to dispatch all memory access requests that are associated with the current memory page from the request queue to the memory, before any other memory access request in the request queue is dispatched. The memory pages referred to here may be physical memory page in the memory. The request queue may be an out-of-order queue such that the memory access requests generated by the plurality of execution units may be inserted into and extracted from any slot in the request queue. The buffering logic circuitry may buffer memory access requests generated by the plurality of execution units in a pending queue if the list of unique memory pages is full. The buffering logic circuitry may track chronologically when each unique memory pages is inserted into the list of unique memory pages, such that if a first unique memory page is inserted into the list of unique memory pages before a second unique memory page is inserted, the first unique memory page is considered older than the second unique memory page. The selection logic circuitry may select the oldest unique memory page from the list of unique memory pages as the current memory page. When dispatching memory access requests that are associated with the current memory page to memory, the selection logic circuitry may first send the requests to a super queue. In some cases, the size of the request queue is larger than the super queue. The super queue may be part of the apparatus or part of a memory interface that is communicatively coupled to the apparatus and the uncore.

Yet another embodiment of the present invention is a method that includes storing memory access requests generated by a plurality of execution units in a request queue. These memory access requests may include a first request to access a first memory page in a memory and a second request to access a second memory page in the memory. The first memory page being different from the second memory page. The method may also include maintaining a list of unique memory pages where each unique memory page is associated with one or more memory access requests that are stored the request queue. Each unique memory page is to be accessed by its associated memory access requests. The method may further include selecting a current memory page from the list of unique memory pages and dispatching all memory access requests that are associated with the current memory page from the request queue to the memory, before any other memory access request in the request queue is dispatched. The memory pages referred to here may be physical memory page in the memory. The request queue may be an out-of-order queue such that the memory access requests generated by the plurality of execution units may be inserted into and extracted from any slot in the request queue. The method may further include buffering the memory access requests generated by the plurality of execution units in a pending queue if the list of unique memory pages is full. The method may also include tracking chronologically when each unique memory pages is inserted into the list of unique memory pages, such that if a first unique memory page is inserted into the list of unique memory pages before a second unique memory page is inserted, the first unique memory page is older than the second unique memory page. The oldest unique memory page from the list of unique memory pages may be selected as the current memory page. When dispatching memory access requests that are associated with the current memory page to memory, the requests may first be send to a super queue. In some cases, the size of the request queue is larger than the super queue.

Figure 11:
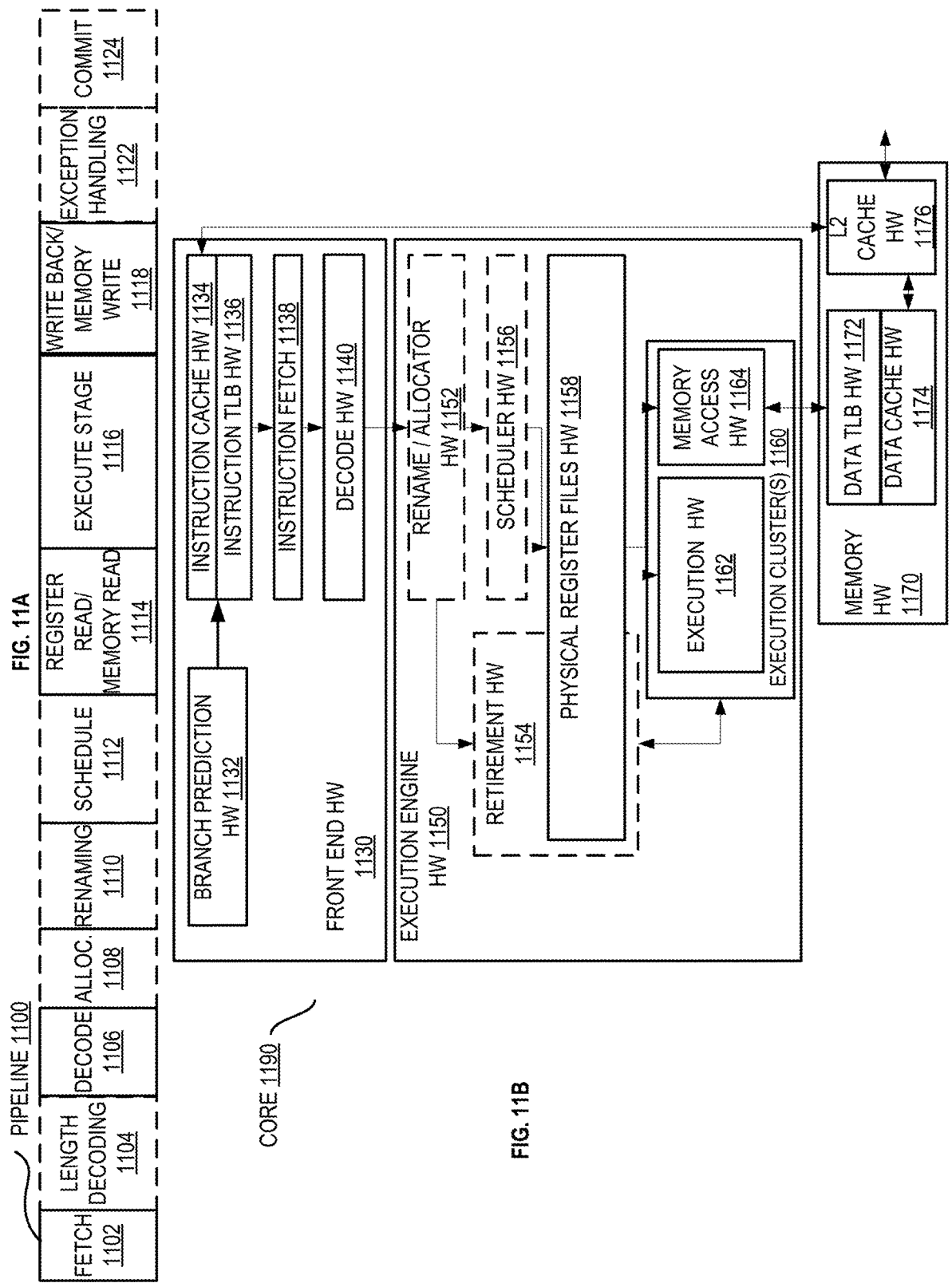
FIG. 11A is a block diagram illustrating both an exemplary in-order pipeline and an exemplary register renaming, out-of-order issue/execution pipeline according to embodiments of the invention.
FIG. 11B is a block diagram illustrating both an exemplary embodiment of an in-order architecture core and an exemplary register renaming, out-of-order issue/execution architecture core to be included in a processor according to embodiments of the invention.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end hardware 1130 coupled to an execution engine hardware 1150, and both are coupled to a memory hardware 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end hardware 1130 includes a branch prediction hardware 1132 coupled to an instruction cache hardware 1134, which is coupled to an instruction translation lookaside buffer (TLB) 1136, which is coupled to an instruction fetch hardware 1138, which is coupled to a decode hardware 1140. The decode hardware 1140 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode hardware 1140 or otherwise within the front end hardware 1130). The decode hardware 1140 is coupled to a rename/allocator hardware 1152 in the execution engine hardware 1150.

The execution engine hardware 1150 includes the rename/allocator hardware 1152 coupled to a retirement hardware 1154 and a set of one or more scheduler hardware 1156. The scheduler hardware 1156 represents any number of different schedulers, including reservations stations, central instruction window, etc. The scheduler hardware 1156 is coupled to the physical register file(s) hardware 1158. Each of the physical register file(s) hardware 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1158 comprises a vector registers hardware, a write mask registers hardware, and a scalar registers hardware. These register hardware may provide architectural vector registers, vector mask registers, and general purpose registers. The physical register file(s) hardware 1158 is overlapped by the retirement hardware 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1154 and the physical register file(s) hardware 1158 are coupled to the execution cluster(s) 1160. The execution cluster(s) 1160 includes a set of one or more execution hardware 1162 and a set of one or more memory access hardware 1164. The execution hardware 1162 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1156, physical register file(s) hardware 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1164). It should also be understood that where separate pipelines are used, one or more of these pipelines may be out-of-order issue/execution and the rest in-order.

The set of memory access hardware 1164 is coupled to the memory hardware 1170, which includes a data TLB hardware 1172 coupled to a data cache hardware 1174 coupled to a level 2 (L2) cache hardware 1176. In one exemplary embodiment, the memory access hardware 1164 may include a load hardware, a store address hardware, and a store data hardware, each of which is coupled to the data TLB hardware 1172 in the memory hardware 1170. The instruction cache hardware 1134 is further coupled to a level 2 (L2) cache hardware 1176 in the memory hardware 1170. The L2 cache hardware 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode hardware 1140 performs the decode stage 1106; 3) the rename/allocator hardware 1152 performs the allocation stage 1108 and renaming stage 1110; 4) the scheduler hardware 1156 performs the schedule stage 1112; 5) the physical register file(s) hardware 1158 and the memory hardware 1170 perform the register read/memory read stage 1114; the execution cluster 1160 perform the execute stage 1116; 6) the memory hardware 1170 and the physical register file(s) hardware 1158 perform the write back/memory write stage 1118; 7) various hardware may be involved in the exception handling stage 1122; and 8) the retirement hardware 1154 and the physical register file(s) hardware 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1134/1174 and a shared L2 cache hardware 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
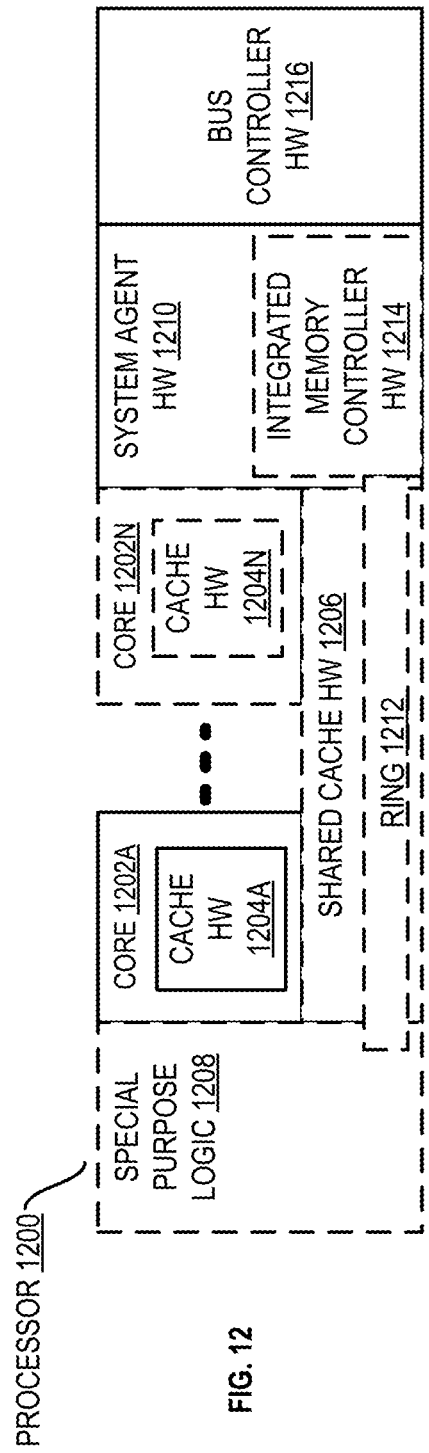
FIG. 12 is a block diagram of a single core processor and a multicore processor with integrated memory controller and graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller hardware 1216, while the optional addition of the dashed lined boxes illustrates an alternative processor 1200 with multiple cores 1202A-N, a set of one or more integrated memory controller hardware 1214 in the system agent hardware 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1206, and external memory (not shown) coupled to the set of integrated memory controller hardware 1214. The set of shared cache hardware 1206 may include one or more mid-level caches, such as level 2 (L2), level 3 (L3), level 4 (L4), or other levels of cache, a last level cache (LLC), and/or combinations thereof. While in one embodiment a ring based interconnect hardware 1212 interconnects the integrated graphics logic 1208, the set of shared cache hardware 1206, and the system agent hardware 1210/integrated memory controller hardware 1214, alternative embodiments may use any number of well-known techniques for interconnecting such hardware. In one embodiment, coherency is maintained between one or more cache hardware 1206 and cores 1202-A-N.

In some embodiments, one or more of the cores 1202A-N are capable of multi-threading. The system agent 1210 includes those components coordinating and operating cores 1202A-N. The system agent hardware 1210 may include for example a power control unit (PCU) and a display hardware. The PCU may be or include logic and components needed for regulating the power state of the cores 1202A-N and the integrated graphics logic 1208. The display hardware is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set. In one embodiment, the cores 1202A-N are heterogeneous and include both the "small" cores and "big" cores described below.

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
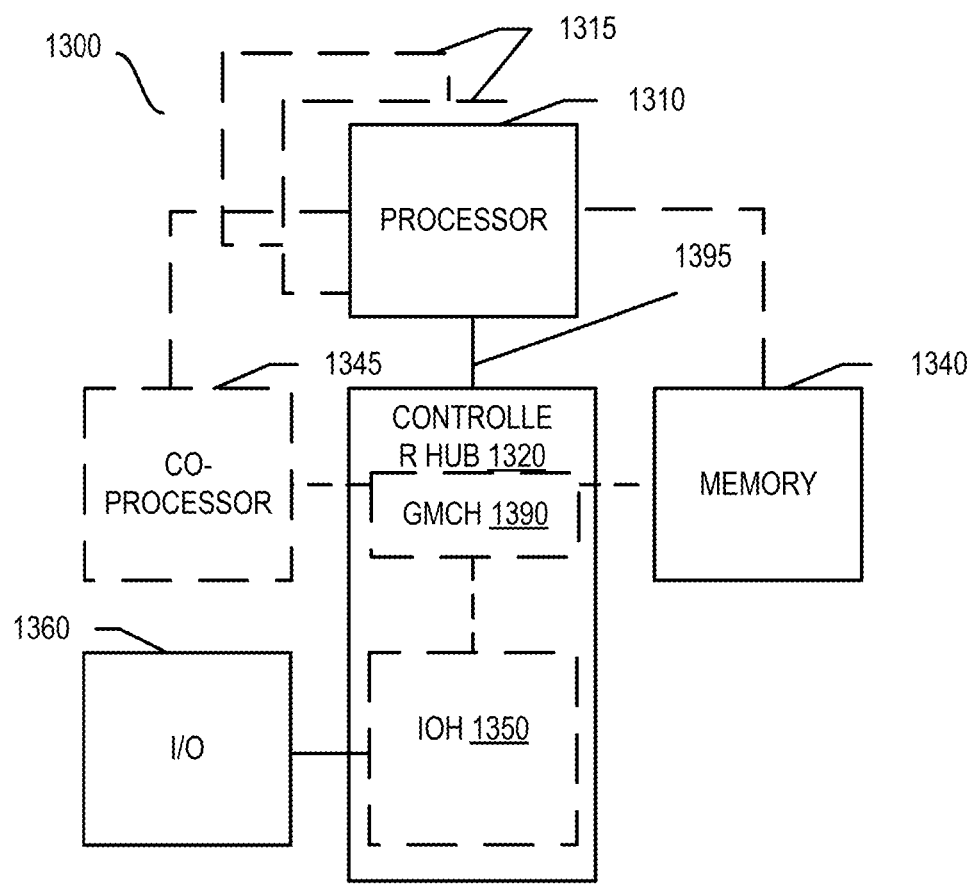
FIG. 13 illustrates a block diagram of a system in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface, or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
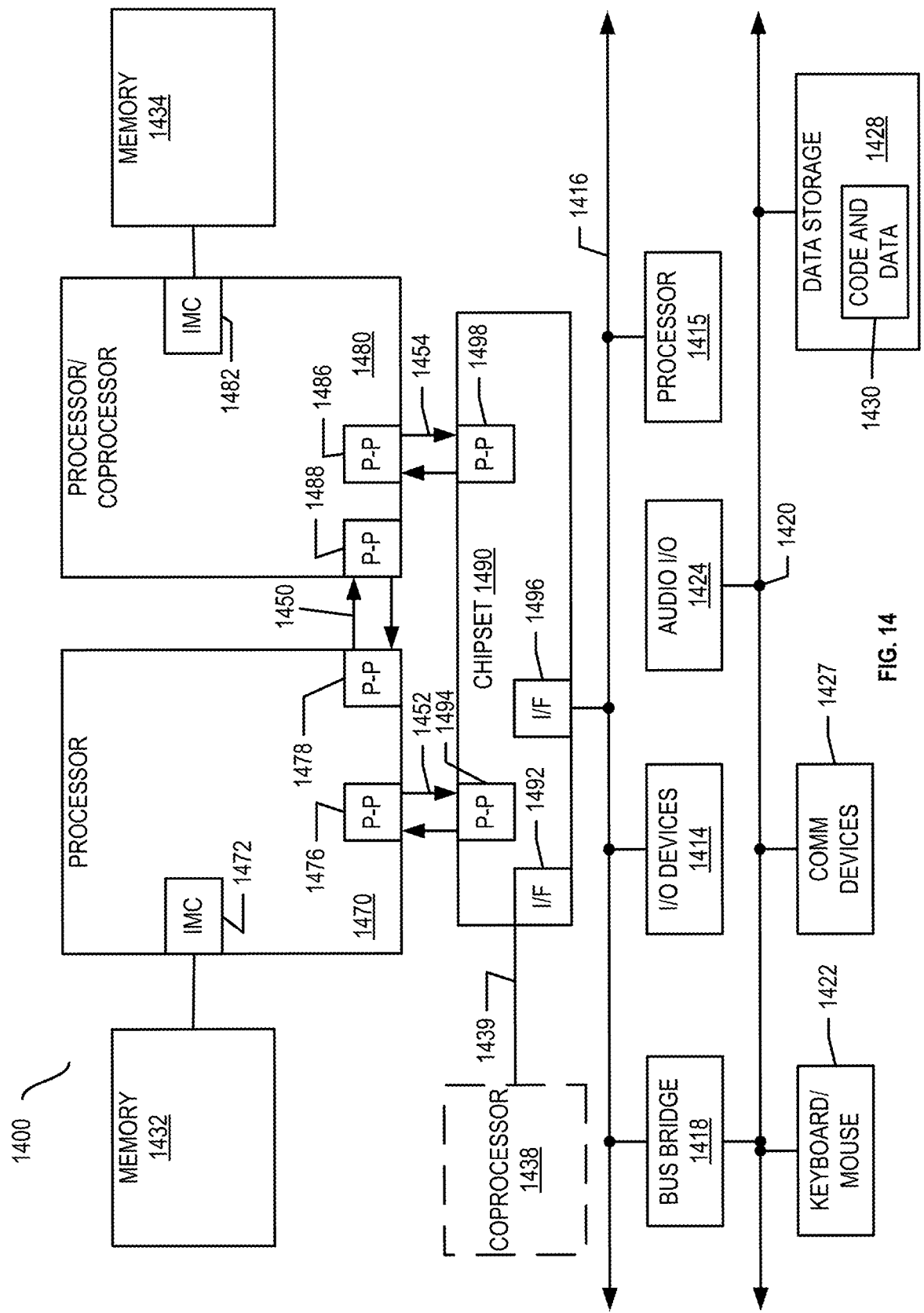
FIG. 14 illustrates a block diagram of a second system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) hardware 1472 and 1482, respectively. Processor 1470 also includes as part of its bus controller hardware point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) hardware), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage hardware 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
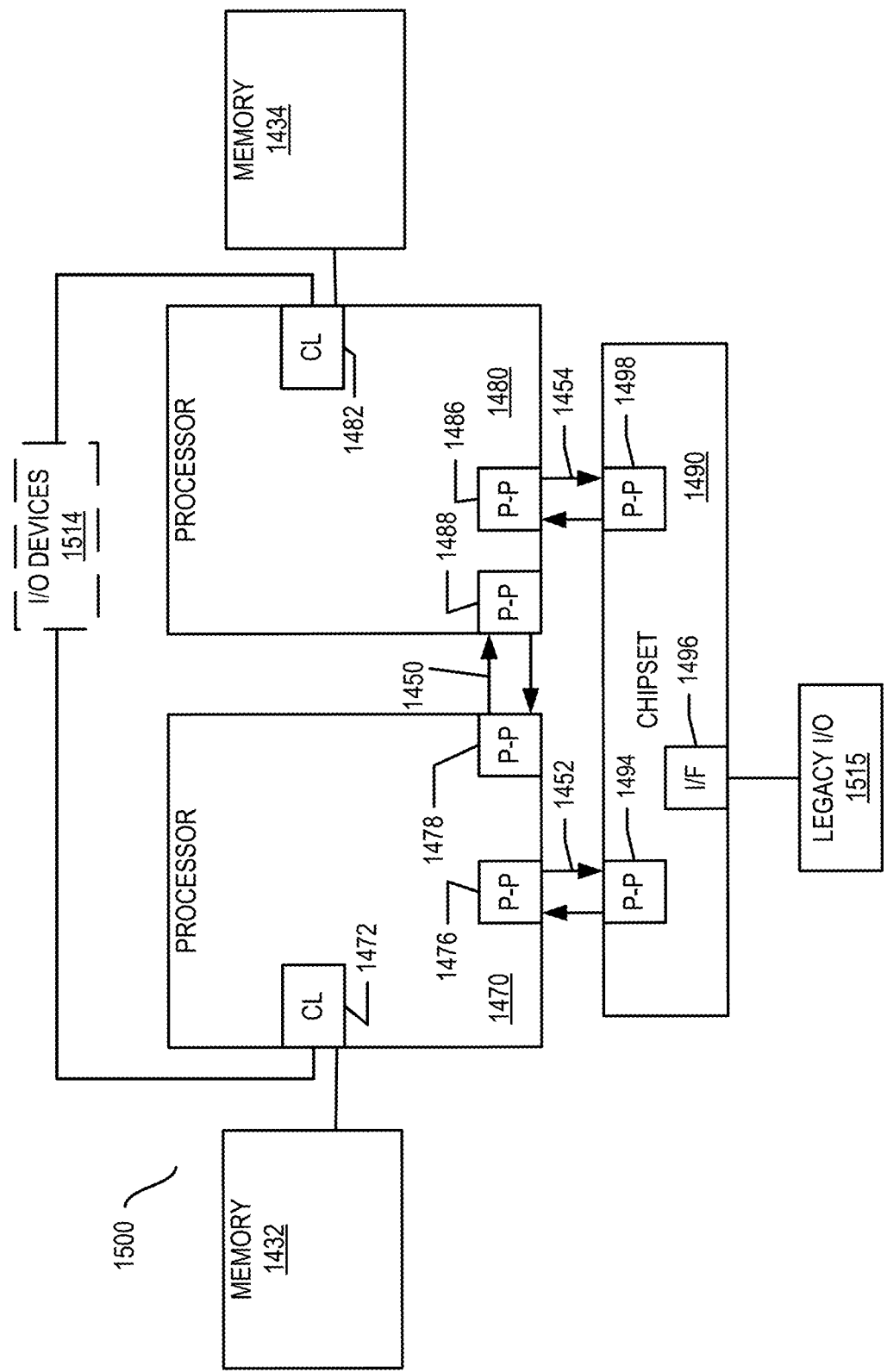
FIG. 15 illustrates a block diagram of a third system in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller hardware and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
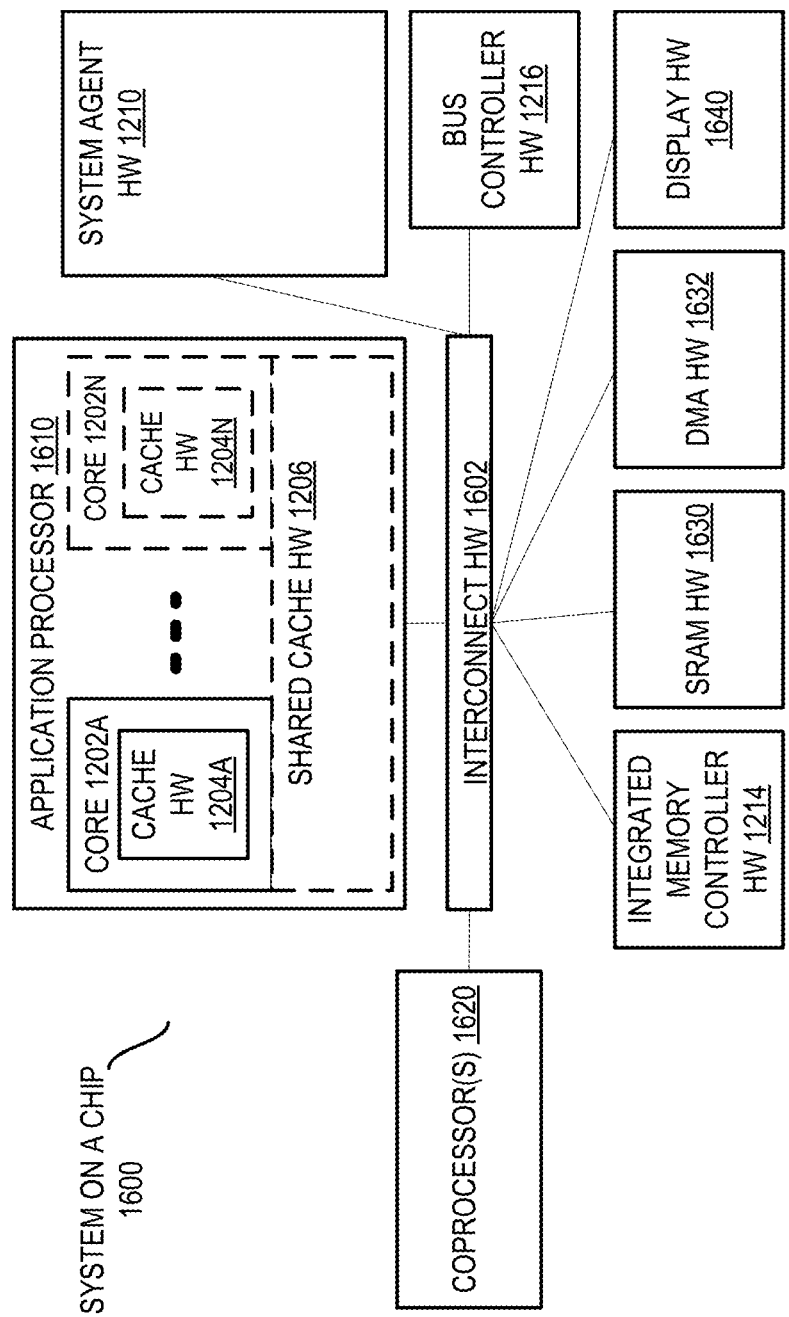
FIG. 16 illustrates a block diagram of a system on a chip (SoC) in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect hardware 1602 is coupled to: an application processor 1610 which includes a set of one or more cores 1202A-N and shared cache hardware 1206; a system agent hardware 1210; a bus controller hardware 1216; an integrated memory controller hardware 1214; a set or one or more coprocessors 1620 which may include integrated graphics logic, an image processor, an audio processor, and a video processor; an static random access memory (SRAM) hardware 1630; a direct memory access (DMA) hardware 1632; and a display hardware 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A processor comprising:
    a plurality of execution units;
    a request queue; and
    a memory aware reordered source (MARS) circuitry coupled to the plurality of execution units and the request queue, the MARS circuitry to:
        store, in the request queue, a plurality of memory access requests generated by the plurality of execution units, the plurality of memory access requests comprising at least a first request to access a first memory page in a memory and a second request to access a second memory page in the memory;
        maintain a list of unique memory pages to be accessed by the plurality of memory access requests, each of the unique memory pages associated with one or more of the plurality of memory access requests stored in the request queue and is to be accessed by the one or more memory access requests, wherein the list of unique memory pages comprises a plurality of entries, each entry comprising a page number field to store a page number of a corresponding unique memory page and a count field to store a number of memory requests in the request queue associated with the corresponding unique memory page;
        select a current memory page from the list of unique memory pages based on an age associated with each memory page in the list of unique memory pages, the current memory page associated with two or more memory access requests stored in the request queue, at least some of the two or more memory access requests are not stored consecutively in the request queue; and
        dispatch, from the request queue, the two or more memory access requests associated with the current memory page before any other memory access request in the request queue is dispatched.

2. The processor of claim 1, wherein each memory page is a physical memory page in the memory.

3. The processor of claim 1, wherein the request queue is an out-of-order queue such that the memory access requests generated by the plurality of execution units may be inserted into and extracted from any slot in the request queue.

4. The processor of claim 1, wherein the MARS circuitry to buffer the memory access requests generated by the plurality of execution units in a pending queue if the list of unique memory pages is full.

5. The processor of claim 1, wherein the MARS circuitry is to track chronologically when each unique memory page is inserted into the list of unique memory pages, wherein if a first unique memory page is inserted into the list of unique memory pages before a second unique memory page is inserted, the first unique memory page is older than the second unique memory page.

6. The processor of claim 1, wherein the current memory page is oldest of all unique memory pages in the list of unique memory pages.

7. The processor of claim 1, wherein dispatching from the request queue to the memory all memory access requests associated with the current memory page comprises first sending all memory access requests associate with the current memory page to a super queue.

8. The processor of claim 7, wherein the request queue is larger in size than the super queue.

9. The processor of claim 8, wherein the super queue is part of the MARS circuitry.

10. The processor of claim 8, wherein the super queue is part of a memory interface, wherein the memory interface is coupled to the MARS circuitry and an uncore.

11. An apparatus coupled to a plurality of execution units of a processor core, the apparatus comprising:
buffering logic circuitry to:
store, in a request queue, a plurality of memory access requests generated by the plurality of execution units, the plurality of memory access requests comprising at least a first request to access a first memory page in a memory and a second request to access a second memory page in the memory; and
maintain a list of unique memory pages to be accessed by the plurality of memory access requests, each of the unique memory pages associated with one or more of the plurality of memory access requests stored in the request queue and is to be accessed by the one or more memory access requests, wherein the list of unique memory pages comprises a plurality of entries, each entry comprising a page number field to store a page number of a corresponding unique memory page and a count field to store a number of memory requests in the request queue associated with the corresponding unique memory page; and
selection logic circuitry to:
select a current memory page from the list of unique memory pages based on an age associated with each memory page in the list of unique memory pages, the current memory page associated with two or more memory access requests stored in the request queue, at least some of the two or more memory access requests are not stored consecutively in the request queue; and
dispatch, from the request queue, the two or more memory access requests associated with the current memory page before any other memory access request in the request queue is dispatched.

12. The apparatus of claim 11, wherein each memory page is a physical memory page in the memory.

13. The apparatus of claim 11, wherein the request queue is an out-of-order queue such that the memory access requests generated by the plurality of execution units may be inserted into and extracted from any slot in the request queue.

14. The apparatus of claim 11, wherein the buffering logic circuitry to buffer the memory access requests generated by the plurality of execution units in a pending queue if the list of unique memory pages is full.

15. The apparatus of claim 11, wherein the buffering logic circuitry is to track chronologically when each unique memory page is inserted into the list of unique memory pages, wherein if a first unique memory page is inserted into the list of unique memory pages before a second unique memory page is inserted, the first unique memory page is older than the second unique memory page.

16. The apparatus of claim 11, wherein the current memory page is oldest of all unique memory pages in the list of unique memory pages.

17. The apparatus of claim 11, wherein dispatching from the request queue to the memory all memory access requests associated with the current memory page comprises first sending all memory access requests associate with the current memory page to a super queue.

18. The apparatus of claim 17, wherein the request queue is larger in size than the super queue.

19. The apparatus of claim 18, wherein the super queue is part of the apparatus.

20. The apparatus of claim 18, wherein the super queue is part of a memory interface, wherein the memory interface is coupled to the apparatus and an uncore.

21. A method comprising:
storing, in a request queue, a plurality of memory access requests generated by a plurality of execution units, the plurality of memory access requests comprising a first request to access at least a first memory page in a memory and a second request to access a second memory page in the memory;
maintaining a list of unique memory pages to be accessed by the plurality of memory access requests, each of the unique memory pages associated with one or more of the plurality of memory access requests stored in the request queue and is to be accessed by the one or more memory access requests, wherein the list of unique memory pages comprises a plurality of entries, each entry comprising a page number field to store a page number of a corresponding unique memory page and a count field to store a number of memory requests in the request queue associated with the corresponding unique memory page;
selecting a current memory page from the list of unique memory pages based on an age associated with each memory page in the list of unique memory pages, the current memory page associated with two or more memory access requests stored in the request queue, at least some of the two or more memory access requests are not stored consecutively in the request queue; and
dispatching, from the request queue, the two or more memory access requests associated with the current memory page before any other memory access request in the request queue is dispatched.

22. The method of claim 21, wherein each memory page is a physical memory page in the memory.

23. The method of claim 21, wherein the request queue is an out-of-order queue such that the memory access requests generated by the plurality of execution units may be inserted into and extracted from any slot in the request queue.

24. The method of claim 21, further comprising buffering the memory access requests generated by the plurality of execution units in a pending queue if the list of unique memory pages is full.

25. The method of claim 21, further comprising tracking chronologically when each unique memory page is inserted into the list of unique memory pages, wherein if a first unique memory page is inserted into the list of unique memory pages before a second unique memory page is inserted, the first unique memory page is older than the second unique memory page.

* * * * *